United States Patent [19]

Laakmann et al.

[11] Patent Number: 5,065,405
[45] Date of Patent: Nov. 12, 1991

[54] SEALED-OFF, RF-EXCITED GAS LASERS AND METHOD FOR THEIR MANUFACTURE

[75] Inventors: Peter Laakmann; Stanley R. Byron; Michael W. Barrett, all of Seattle, Wash.

[73] Assignee: Synrad, Incorporated, Bothell, Wash.

[21] Appl. No.: 469,332

[22] Filed: Jan. 24, 1990

[51] Int. Cl.$^5$ .............................................. H01S 3/08
[52] U.S. Cl. ....................................... 372/92; 372/82; 372/99
[58] Field of Search ..................... 372/99, 97, 108, 82

Primary Examiner—Léon Scott, Jr.
Attorney, Agent, or Firm—Seed and Berry

[57] ABSTRACT

An improved sealed-off RF-excited gas laser and method for its manufacture. The resonator section of the laser consists of four optically reflecting longitudinal walls which define the laser bore and plasma section. A concave mirror is mounted on one end of the resonator and a flat or concave output coupler is mounted at the other end. The laser resonator operates in a non-waveguide non-free space mode utilizing wall reflections. Artifacts are introduced at the optically reflecting walls to define a stable oscillatory axis and mode structure by favoring the establishment of stable reflection points along the length of the walls. These artifacts are created by carefully defined bends and tapers in some of the walls to create high mode purity, stability and relatively uncritical optical alignments. Manufacturing methods are disclosed to speed up passivation of the sealed enclosure by internal preexposure of the sealed envelope to oxygen-helium plasmas created at different temperatures, pressures and peak power than seen in the subsequent laser operation.

14 Claims, 2 Drawing Sheets

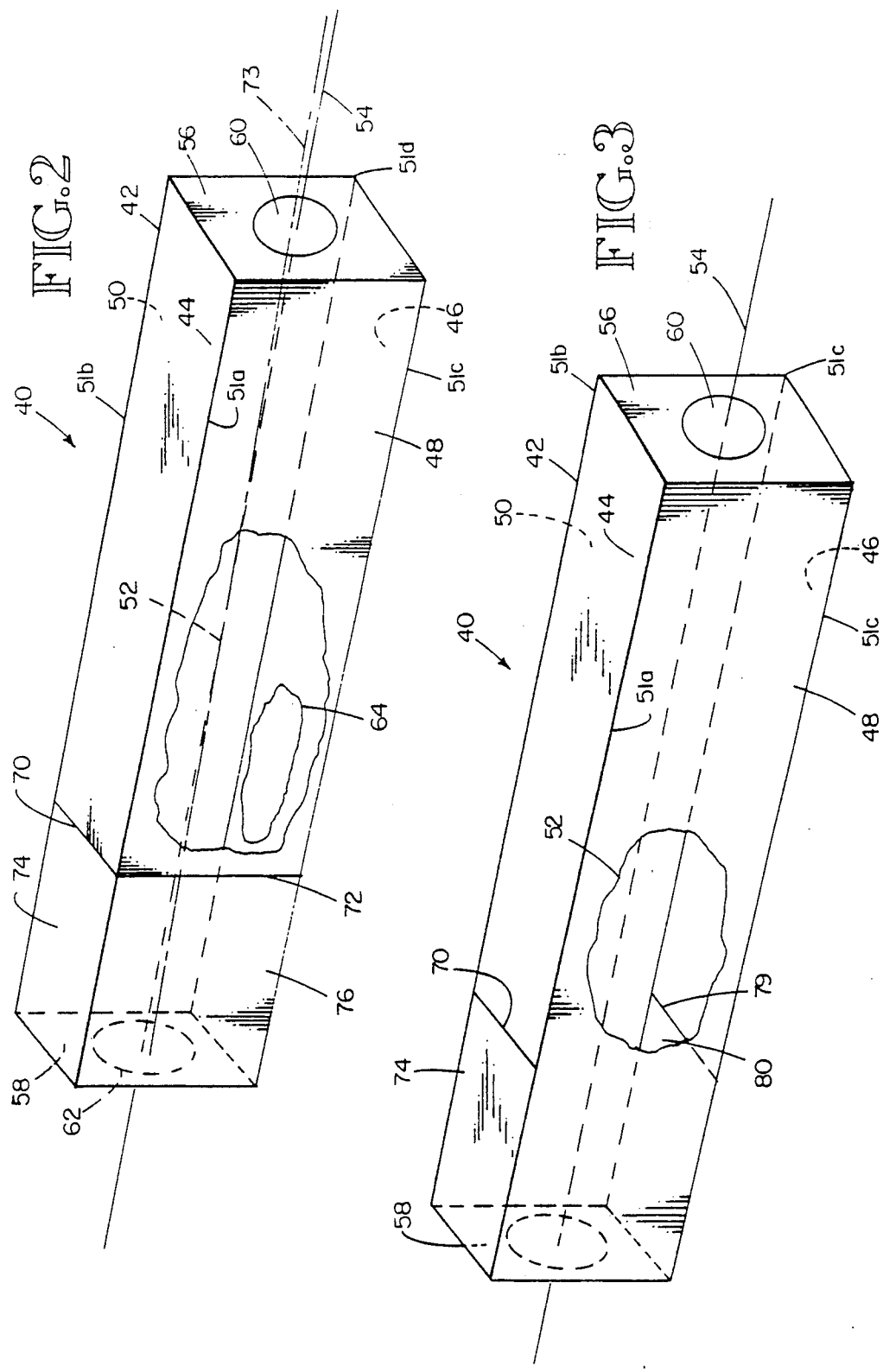

SEALED-OFF, RF-EXCITED GAS LASERS AND METHOD FOR THEIR MANUFACTURE

TECHNICAL FIELD

This invention relates generally to lasers and more particularly to sealed-off, RF-excited gas lasers.

BACKGROUND OF THE INVENTION

Sealed-off RF-excited gas lasers have evolved from early composite metal/ceramic CO2 waveguide devices to ceramic or all-metal structures. Examples of the early, waveguide devices are disclosed in U.S. Pat. No. 4,169,251, issued to Katherine D. Laakmann.

The basic "all-metal" laser structure, disclosed by Peter Laakmann in U.S. Pat. No. 4,805,182, represents the most recent configuration improvement for this class of laser. No combination of materials has been found that can improve on the cost-effectiveness of extruded aluminum as it is used in the "all-metal" laser. However, many remaining problems relating to sealed-off, RF-excited CO and CO2 discharge lasers still exist which are independent of the materials of construction. Challenges such as improving mode discrimination and power stability, increasing resonator efficiency, and increasing operating and shelf life apply to metal/ceramic, all-ceramic, and all-metal lasers. These problems can be addressed by improvements in optical configuration and improved processing methods.

A sealed-off gas laser that is configured neither as a waveguide laser nor as a free space laser shows the best efficiency and/or power output per unit length. True waveguide lasers with Fresnel numbers less than about 0.5 show good mode quality, easy adjustability and good electrical efficiency. However, their power output and operating life are limited because of optical losses in the waveguide cavity and because the optical power density is close to the damage threshold of mirror coatings. True free space optical configurations within transversely excited structures have the converse characteristics. They are sensitive to optical misalignment. Also, their electrical efficiency is low because the cross section of their plasma lasing medium must be larger than the optical mode diameter. Further, they operate at low optical power density and correspondingly low optical power extraction efficiency.

Lasers in the intermediate region (with diameter-to-length ratios of about 0.01, Fresnel numbers of about 1, and bore sizes in the range of 4–6 mm) offer performance that is superior to either waveguide or free space lasers. They rely on the walls to get a high optical fill factor. However, the interaction with the walls is not of a waveguiding nature and involves reflection of a small fraction of the optical beam power. Additionally, the plasma lasing medium has optical refractive power due to thermal gradients, and wall reflections can be used to minimize these optical losses. Very high single transverse mode electrical-to-optical conversion efficiencies, more than 20% for CO2 lasers, have been observed for these intermediate optical configurations. However, optical performance has not always been consistent and no explanation was available previously.

The shelf and operating lives of RF-excited gas lasers range up to several years and several hundred to several thousand hours, respectively. Shelf life is limited by the accumulation of water vapor due to hydrogen outgassing and oxidizing and to diffusion of water vapor through O-ring seals.

The accumulation of water vapor due to diffusion can be handled satisfactorily by either installing a water vapor getter (i.e., zeolite, cellulose), or by using hermetic seals. Combustion of hydrogen has been eliminated as a cause for limited operating life by most of the industry through the use of a high-temperature, high-vacuum bake-out process. Thus, oxygen loss is the principal factor that limits operating life.

Traditional methods to decrease oxygen loss during operation include various passivation methods. They involve burn-in of the finished laser and separate passivation of the internal surfaces. Most of these methods are very slow. For example, it may take a 48-hour burn-in to achieve an operating life of several hundred hours. This clearly limits the factory throughput. Faster methods are desirable.

A CO2 laser operates at temperatures that typically range from about 20 to 45 degrees Celsius. The oxygen species including ozone and atomic oxygen created during operation will slowly oxidize or be imbedded in the various internal surfaces of the laser's enclosure. Some of these processes are fast and some are slow, depending on oxygen species lifetimes and diffusion times. Many oxide species can be formed in the laser, given enough time, unless they already exist. If the oxide species do not already exist, the laser will eventually lose oxygen and its output power will diminish.

Internal laser parts made from ceramic and metal suffer from roughly the same oxidation or oxygen adsorption problem. Oxygen loss is also a problem for CO lasers since a very small amount of oxygen is needed to maintain discharge stability.

It is therefore desirable to have sealed-off RF-excited gas lasers that have improved mode discrimination and improved power stability, as well as increased operating and shelf life.

SUMMARY OF THE INVENTION

It is an object of the present invention to provide an RF-excited gas laser that has improved mode discrimination and mode stability.

It is another object of the present invention to provide an RF-excited laser gas that has improved power stability.

It is a further object of the present invention to provide an RF-excited gas laser that has increased operating life.

It is a still further object of the present invention to provide an RF-excited gas laser that has increased shelf life.

In general, the invention is an electric discharge gas laser. The laser comprises an axial tube and an optical resonator. The axial tube contains an internal plasma discharge section including a plurality of optically reflective elements surrounding the axial plasma discharge volume to form a bore substantially closed in periphery. The optical resonator has an optical axis within one degree of the axial plasma tube axis. At least one of the optically reflecting elements contains lossy or dispersive artifacts or geometrical artifacts that favor the establishment of a single optical axis containing reflection paths that result in a single stable optical mode structure in the resonator.

In one aspect, the invention is an axial enclosure for an RF-excited gas laser comprising first, second, third and fourth longitudinal walls. The walls are positioned with the first and third walls and the second and fourth walls opposite each other. The four longitudinal walls are substantially symmetrically disposed about an axis of the enclosure to define a bore extending along the axis. At least the first and second of the walls have adjacent edges that are edgewise adjacent in the axial direction, the first and second walls forming an oblique angle or right angle therebetween. At least one of the walls contains lossy or dispersive artifacts that favor the establishment of a single stable optical mode structure in the laser.

In another aspect of the invention, having a smaller Fresnel number, the artifact is generated by providing a directional discontinuity in the bore. This can be achieved by a small sharp bend of two or four opposing optically reflecting walls or by using two or four separate optically reflecting walls disposed axially and slightly offset in direction. In this aspect of the invention opposing walls remain essentailly parallel.

In a still further aspect, the invention is a method of passivating an enclosure for a gas laser. The method comprises a first step of preparing a gaseous mixture containing oxygen. The method further comprises the steps of passing the gaseous mixture through the enclosure at a first temperature and a first pressure and then passing the gaseous mixture through the enclosure at a second temperature that is higher or lower than the first temperature, while in both cases operating an electrical discharge in the laser.

BRIEF DESCRIPTION OF THE DRAWINGS

FIG. 2 is a schematic drawing of a first embodiment of a sealed-off RF-excited gas laser of the present invention.

FIG. 3 is a schematic drawing of a second embodiment of a sealed-off RF-excited gas laser of the present invention.

DETAILED DESCRIPTION OF THE INVENTION

Figure 1:
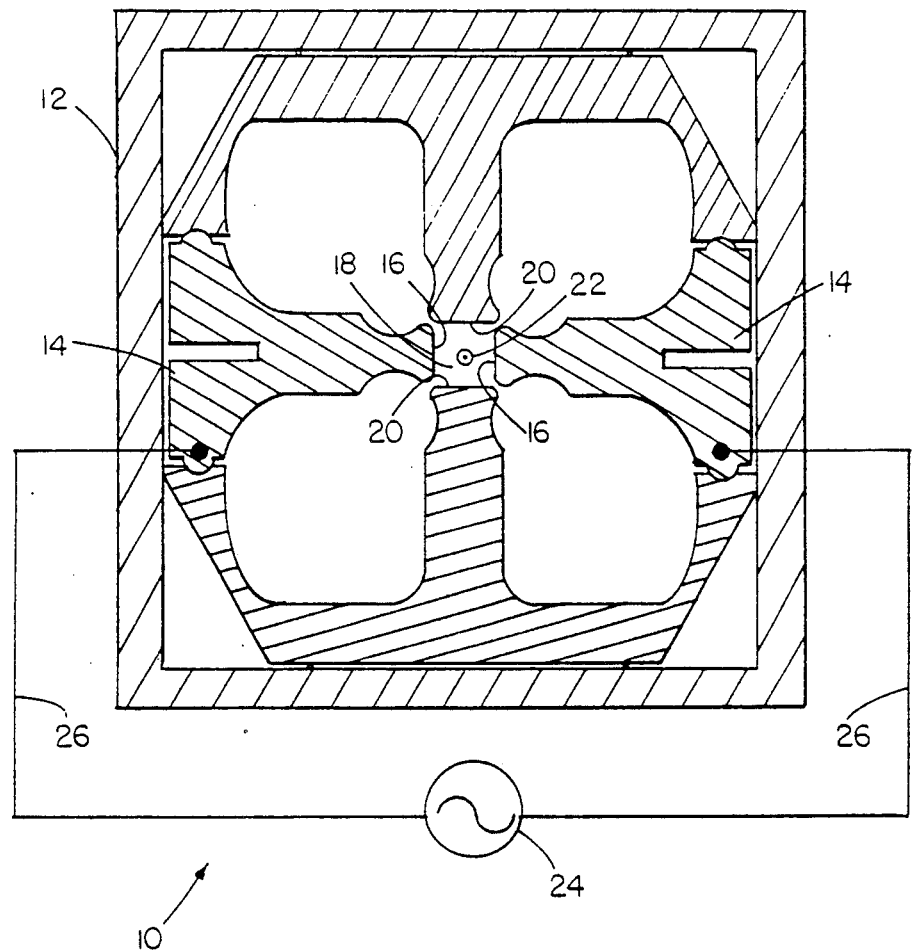
FIG. 1 is a schematic drawing of an RF-excited gas laser known in the prior art.

The variations in optical performance of RF-excited gas lasers have been traced to details of the bore geometry and the mirror alignment relative thereto. FIG. 1 is a schematic drawing of an RF-excited gas laser 10 known in the prior art that can be made to operate in either waveguide, free space, or intermediate regions. The laser 10 includes an enclosure 12 which contains electrodes 14 and a lasing gas, such as a mixture containing CO or $CO_2$. A pair of electrodes 14 have longitudinally extending walls 16 which are opposite one another. The walls 16 in combination with a pair of opposing longitudinal walls 20 define a bore 18 which is generally rectangular in cross section. The bore 18 extends longitudinally within the volume along a longitudinal axis 22. The ends (not shown) of the bore 18 are defined by two optical reflectors (not shown), such as mirrors. At least one of the mirrors is partially transparent, thereby permitting the outcoupling of the light energy produced by the laser 10. The mirrors are positioned along the longitudinal optical axis 22 and the bore 18 is placed symmetrically about the optical axis 22.

The electrodes 14 are excited by a source 24 of radio frequency (RF) energy through the electrical leads 26. The electric field produced between the electrodes 14 when connected to the RF source 24 excites the lasing gas contained within the bore 18, to create a plasma which begins to emit light energy. The light energy which is emitted substantially along or parallel to the optical axis 22 is preferentially amplified in the optical resonator formed by the bore 18 and the mirrors.

When used in the intermediate region, a perfectly straight and parallel bore 18 does not necessarily provide a stable optical mode within the bore. The enclosure 12 acts as an optical resonator by using the walls 16 and 20 as part of an optical system. However, since the laser 10 is an oscillator, it is possible for some of the optical oscillations to take place along different paths as the cavity temperature varies, utilizing different reflection points on the walls 16 and 20. Some reflected paths have higher gain or lower optical loss than others.

A nearly perfect bore 18 is required for an efficient waveguide laser, which typically has a Fresnel number of less than 0.5. Perfect alignment of the mirrors with the optical axis 22 at the ends of the bore 18 will produce good mode quality, but only with the disadvantages of waveguide lasers noted earlier.

It has been determined that the best mode quality and laser output power for lasers in the intermediate region (Fresnel numbers of 0.7 to 1.3) is often found by aligning the mirrors slightly off-axis. This is particularly true for lasers that operate at a diameter-to-length ratio between 0.01 and 0.015 and a Fresnel number of 1 or greater. FIG. 2 is a schematic drawing of a first embodiment of a sealed-off, RF-excited gas laser 40 of the present invention. The gas laser 40 includes an enclosure 42 which can be sealed to enclose a lasing gas. The enclosure is defined by four walls, 44, 46, 48, and 50, each containing an electrode (not shown), either grounded or connected to a source of RF voltage (not shown). The walls 44 and 46 are positioned opposite each other and adjacent to the walls 48 and 50. The walls 48 and 50 are positioned opposite each other and adjacent to the walls 44 and 46. The wall 44 has a pair of longitudinal edges, each contiguous and coextensive with one or the other walls 48 and 50 to define a pair of wall corners 51$a$ and 51$b$, and the wall 46 has a pair of longitudinal edges, each contiguous and coextensive with one or the other of the walls 48 and 50 to define a pair of corners 51$c$ and 51$d$. The walls 44, 46, 48 and 50 define a generally rectangular cross section bore 52 extending longitudinally along a longitudinal optical axis 54 in general axial alignment therewith. The adjacent walls 44 and 48 lie at essentially a right angle relative to each other in a plane perpendicular to the longitudinal optical axis 54, as do the walls 46 and 50.

Figure 4:
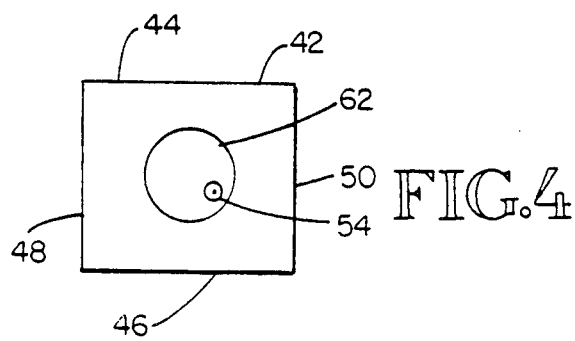
FIG. 4 is a cross sectional end view of the embodiments of the gas lasers shown in FIGS. 2 and 3.

The enclosure 42 also includes end walls 56 and 58 generally oriented perpendicular to the optical axis 54. The end walls 56 and 58 respectively support mirrors 60 and 62, respectively, which are held substantially perpendicular to the optical axis 54. One mirror 60 is flat, while the other mirror 62 can be concave, or both mirrors can be concave. By tilting the mirrors 60 and 62, the optical axis 54 can be located closer to one or both of the two adjacent walls 46 and 50 than to one or both of the two adjacent walls 44 and 48 (see FIG. 4). By this shift in location of the optical axis 54, the undesired optical modes are substantially eliminated from the bore 52, when suitable artifacts have been applied to the two adjacent walls 44 and 48.

A single dominant optical beam direction is required to achieve a stable mode structure in a laser. However, spurious reflections from the walls can cause a shift in the direction of the laser beam (relative to the optical axis 54), or a split in the laser beam pattern, among other undesirable effects. By introducing imperfections in the walls that define the bore, the laser's oscillations can be limited to occur only along a single desired path. At the same time, the laser can have closely spaced walls that are essential to discriminate against higher order modes and to produce high electrical efficiency. The imperfections can be variations in the optical properties of the wall. For example, an area 64 on the inner surface of wall 46 can be lossy or dispersive. These imperfections can locally degrade the reflective properties of the wall in which they are formed. Alternatively, the imperfections can be geometric.

Nearly 100 percent of the laser tubes built in accordance with the embodiment of FIG. 2 have the desired high degree of mode control. In production, this high yield has been accomplished by introducing two types of geometrical configuration changes into the otherwise square bore of the laser tube. One of the changes is that the bore 52 of the laser 40, shown in FIG. 2, has a slight flare or taper in the walls 44, 46, 48 and 50 all along the optical axis 54. The bore 52 is thus slightly larger near the concave mirror 62 than it is at the mirror 60. The taper angle between the wall surfaces 44, 46, 48 and 50 and the axis of the bore 52 is less than 1 milliradian. Another change is the use of sharp inward bends in each of the two adjacent walls 44 and 48, respectively, also near the concave mirror 62. The bends in the walls 44 and 48 extend between the lines 70 and 72, respectively, and define end portions 74 and 76. The lines 70 and 72 lie in a plane that is substantially perpendicular to the optical axis 54, and the endwall 58. The amount of bend of each of the walls 44 and 48 in the region between lines 70 and 72, respectively, and the endwall 58 is less than the amount of the taper used by a few thousandths of an inch. The amount of bend includes an angle in the range of 5 to 10 milliradians. The walls 46 and 50 have no similar bends. The optical axis 54 can be tilted toward the other two adjacent walls 46 and 50 near the mirror 62. The angle of deviation of the optical axis 54 from an axis of geometric symmetry 73 for the enclosure 42 is less than one degree. The sidewall corner 51d can be a square corner.

FIG. 3 is a schematic drawing of a second embodiment of a sealed-off RF-excited gas laser of the present invention. In this embodiment, only the bends 70 and 78, which define the end portions 74 and 80 in the opposing walls 44 and 46, respectively, are sharp bends. The bend 70 in wall 44 is concave, and the bend 78, in wall 46 is convex, or vice versa. The bend angles are small, generally less than 1 milliradian, and the location of both bends 70 and 78 along the axis 54 in FIG. 3 may be approximately midway between mirrors 60 and 62.

The need for these geometric artifacts has been found experimentally, after building hundreds of tubes of slightly different geometry. Their usefulness can now be explained by noting that the taper of the optical mode matches the bore taper in direction and the bore taper angle is somewhat smaller than that of the optical mode. This causes only near-grazing reflections from the walls 44, 46, 48 and 50 to occur within the laser bore 52, with a minimal phase difference relative to light rays which pass directly along the optical axis 54.

The large bend angle of the two adjacent walls 44 and 48 (see FIG. 2) and the small bend angle of the two opposing walls 44 and 46 (see FIG. 3) prevent reflections off all four walls 44, 46, 48 and 50 from cooperating in phase to produce competing modes and undesirable parasitic oscillations. In the case of the first embodiment shown in FIG. 2, the optical axis 54 of the bore 52 can also be adjusted away from one or both of the bent walls 44 and 48. This allows the laser 40 to make constructive use of the reflections from one or both of the other unbent walls 46 and 50. In case of the second embodiment shown in FIG. 3, if the bends 70 and 78 are located midway between the mirrors 60 and 62, the laser 40 is able to make constructive use of the reflections from the walls 44 and 46.

Reflections of a small portion of the cavity power off the walls 44, 46, 48 and 50 of the bore 54 can be used constructively in two different ways by the resonator mode structure. One way involves the rays reflected through small angles traveling adjacent to unreflected rays. These reflected rays will contribute constructively to the laser output as long as the extra optical path length accumulated in one pass between the mirrors 60 and 62 is a very small fraction of a wavelength (less than 0.05 k). Thus, wall reflection angles up 1 milliradian are acceptable in a resonator with a diameter-to-length ratio about 0.01 and a Fresnel number about 1. One benefit of this effect is that propagation losses due to the negative lens created by the heated laser gas are reduced because useful laser energy is carried by the reflected rays.

Larger reflection angles produce interference effects that generally degrade the quality of the beam, the beam power, and the mode stability produced by the laser 40. In this way the bent wall segments 74 and 76 in FIG. 2 eliminate secondary laser oscillations or higher order modes that would be supported by rays that are reflected off the walls 44 and 48. However, specific reflection angles from "perfect" walls 46 and 50 can produce constructive interference in a round trip through the resonator. These angles maintain good phase coherence between the dominant unreflected and weaker reflected components of the mode.

There are two further advantages of wall reflections of this type. One is that the first higher order transverse mode can be suppressed by the wall interaction. Another is that the corner reflection effect between the wall and mirror at each end of the cavity makes the output power considerably less sensitive to misalignment of the mirrors 60 and 62 than in the case where there are no wall reflections. It has been found that the mirror alignments of these lasers are less critical than those of either waveguide lasers or free space lasers.

The beneficial effects of the wall reflections can be increased by making any one or more of the walls 44, 46, 48, and 50 slightly concave throughout the useful length of the wall. Then the wall behaves like a very weak focusing mirror, and reflections from the wall act to increase the mode stability of the optical resonator. The optical reflection angles off various points along the concave wall deviate from those off a straight wall by less than 1 milliradian.

As regards the effects of oxygen loss on operating life, it has been found that no amount of chemical passivation can produce the passivation accomplished by actually running a plasma. Evidence points to various species of oxygen that are generated by the discharge that also serve as oxidizing materials in ways that cannot be completely duplicated by chemical processes that do not involve a plasma. These oxygen species include atomic oxygen as well as ozone. The oxidation process is a function of the temperature in the laser enclosure 42, since different oxides are formed at different rates depending on the temperature of the plasma in the bore 52 and the temperature of the laser enclosure 42. For example, the half life of ozone is a strong function of temperature.

At high temperatures, the reaction rates in the gas mixture used for burn-in can effectively prevent ozone from reaching enclosure surfaces at most a few tenths of an inch from the plasma in the bore 52. However, the other oxides are still being formed but at different rates. To create all the different oxides that can form over the life of the laser 40 in an efficient manner, it is best to operate an oxygen plasma in the bore 52 at several different temperatures and at peak excitation powers that exceed those that will be supplied to the laser in normal operation. At low temperatures, ozone and atomic oxygen (and possibly other products of the plasma) are allowed to diffuse to the far corners of the laser enclosure 42, while at increasingly higher temperatures oxides peculiar to high temperatures are formed near the bore 52. High temperatures also speed up diffusion of oxides through the solid materials that are being passivated inside the laser enclosure 42. This forms a completely passivated layer in a shorter time than can be done at lower temperature.

With a variable temperature oxygen plasma burn-in using a flowing 50:50 mixture of oxygen and helium, passivation of the laser enclosure 42 can be achieved in 24 hours. This passivation is sufficient to provide a laser capable of thousands of operating hours. The burn-in takes place at room temperature and at a temperature that is less than 100 degrees Celsius (for example, about 80 degrees Celsius) for approximately equal periods of time. The gas pressure is set to be below the normal laser operating pressure and the plasma is turned on and off at a 50 percent duty cycle at 1 kHz repetition rate using average power equal to CW operating power. If desired, the electrical power can be pulsed at peak power values exceeding the intended power of the laser. These conditions provide a larger plasma cloud and create greater diffusion distances for active oxidizing species. These conditions are adjusted to favor the creation of different oxides at rates much higher than are possible during actual laser operation. This assures that even the most slowly-growing oxides have been pre-established in the laser enclosure 42 before it is sealed. Additionally, burn-in at temperatures below room temperature may shorten the process time further.

The oxygen burn-in is accomplished after a high vacuum bake and before the installation of the optics, including the mirrors 60 and 62. The oxygen plasma also serves to clean the bore 52, which prevents contamination of the optics during laser operation. After oxygen burn-in, the optics are added to the laser enclosure 42 and the enclosure is quickly evacuated at temperatures of about 100 degrees C. The time for the final bake-out of the laser enclosure 42 and evacuation should be minimal in order not to disturb the various oxides created. However, it should be sufficiently long to dry out any water vapor getter used. A period of a few hours is sufficient. The final bake-out is preferably done at temperatures between 50 degrees Celsius and 100 degrees Celsius. Thereafter a single final laser gas fill is all that is required to achieve an extended full operating life of the laser enclosure 42.

While the detailed description above has been expressed in terms of specific embodiments, those skilled in the art will appreciate that many other embodiments could be used to accomplish the purpose of the disclosed inventive apparatus. Accordingly, it can be appreciated that various modifications of the above-described embodiments and method may be made without departing from the spirit and the scope of the invention. Therefore, the present invention is to be limited only by the following claims.

We claim:

1. An electric discharge gas laser, comprising
   an axial tube containing an internal plasma discharge section including a plurality of reflective optical elements surrounding an axial plasma discharge volume to form a bore substantially closed in periphery;
   a laser gas contained in the plasma discharge section;
   a pump energy source for exciting the laser gas to produce optical energy; and
   an optical resonator, having an optical axis within one degree of the axial plasma tube axis, for causing the optical energy to resonate therein,
   at least one of said reflective optical elements containing a feature that favors the establishment of a single optical axis containing reflection paths that result in the optical energy having a single stable optical mode structure in the resonator.

2. The laser of claim 1 wherein said plurality of reflective optical elements includes four reflective optical elements, two of said elements being arranged adjacently at substantially right angles and substantially planar, at least one of the remaining two elements comprising two substantially planar sections with a non-coplanar orientation positioned toward one end of said one remaining element to reflect the optical energy in a plurality of directions.

3. The laser of claim 2 wherein the optical resonator includes a flat mirror at one end and a concave mirror at the opposite end, said reflective optical elements arranged to have larger separation near the curved mirror end of the resonator to form an axial laser bore that is tapered.

4. The laser of claim 3 wherein said feature is located near the curved mirror and is concave.

5. The laser of claim 2 wherein the optical axis of said resonator is disposed slightly more closely toward at least one of said straight reflective optical elements than it is disposed toward the opposing optically reflecting elements having the bend artifact.

6. The laser of claim 1 wherein at least two of said reflective optical elements are opposing and said opposing elements are curved slightly concave with respect to one another.

7. The laser of claim 1 wherein at least two of said reflective optical elements are opposing and said opposing elements are bent to form a discontinuity in direction with respect to the optical axis, one of said elements being concave and the opposite element being convex.

8. The laser of claim 7 wherein said discontinuity is formed from a plurality of individually planar reflective optical elements serially arranged in non-axial fashion.

9. The laser of claim 1 wherein said pump energy source is a source of RF-energy.

10. The laser of claim 9, further comprising two discharge electrodes, each electrode being connected to the pump energy source and formed substantially along one of a pair of opposing longitudinal walls that function as two of said optically reflective elements.

11. The laser of claim 9 wherein said RF-excited gas laser is sealed off.

12. An electric discharge gas laser, comprising
an axial tube containing an internal plasma discharge section including a plurality of reflective optical elements surrounding an axial plasma discharge volume to form a bore substantially closed in periphery;
a laser gas contained in the plasma discharge section;
a pump energy source for exciting the laser gas to produce optical energy; and
an optical resonator, having an optical axis within one degree of the axial plasma tube axis, for causing the optical energy to resonate therein,
at least one of said reflective optical elements containing a portion with degraded reflectivity, the degraded reflectivity favoring the establishment of a single optical axis containing reflection paths that result in the optical energy having a single stable optical mode structure in the resonator.

13. The laser of claim 12 wherein at least two of said reflective optical elements are opposing and said opposing elements are curved slightly concave with respect to one another.

14. The laser of claim 12 wherein at least two of said reflective optical elements are opposing and said opposing elements are bent to form a discontinuity in direction with respect to the optical axis, one of said elements being concave and the opposite element being convex.

* * * * *